United States Patent Office
2,872,347
Patented Feb. 3, 1959

2,872,347

COATED THERMOPLASTIC MATERIAL AND METHOD OF COATING THERMOPLASTIC MATERIAL

Marc Goland, New York, Lew Goland, Malverne, and Isidor M. Bernstein, Brooklyn, N. Y., assignors to Printon Corporation, New York, N. Y., a corporation of New York No Drawing. Application August 1, 1957
Serial No. 675,531

11 Claims. (Cl. 117—65)

Our invention relates particularly to a new and improved method of coating base materials of the class of "Saran" and of the class of "Cryovac," with coating materials of the class of "Saran Resin F-120." The invention also includes the respective end-products, irrespective of their method of manufacture.

The term "Saran" identifies a class of flexible and thermoplastic materials which are extensively used in the form of films or foils of different thicknesses, as wrapping materials, and for making containers. Such "Saran" materials may be transparent, translucent, opaque, oriented or non-oriented, pre-shrunk or not pre-shrunk. We can use in this invention all materials of this "Saran" class. Many types of "Saran" films are described in a printed book published by The Dow Chemical Company.

As stated in page 967 of the 1956 edition of "The Condensed Chemical Dictionary" published by Reinhold Publishing Corporation in New York and by Chapman and Hall Limited in London, the term "Saran" identifies a class of thermoplastic resins which are obtained by the polymerization of vinylidene chloride or by the copolymerization of vinylidene chloride with lesser amounts of other unsaturated compounds. The materials of the class of "Saran" are described in Wiley U. S. Patent No. 2,233,442, dated March 4, 1941.

The "Saran" base material which we prefer to use, but without limitation thereto, is a copolymer of vinylidene chloride and vinyl chloride which has been suitably plasticized.

This type of "Saran," without limitation thereto, preferably has 90% by weight of polyvinylidene chloride and 10% by weight of polyvinyl chloride, and a softening point of 115° C. to 138° C. This type of "Saran" and the abovementioned "Cryovac," which is of substantially the same composition, are described in pages 138 and 141 of "Modern Packaging," Encyclopedia Issue for 1957, dated November 1956. As described therein, "Cryovac" is a material of the general class of "Saran." Said "Cryovac" is a highly oriented film, which can be made in tubular form. Said tubular form can be shrunk by heat around an inserted product, such as a meat product.

Said book published by The Dow Chemical Company describes nine types of "Saran" film, which include types "517," "A517," "D517," "B517" and "DR517." We prefer to use these types.

In order to get a strong and permanent and non-peeling seal between abutting layers of "Saran" or "Cryovac," it is necessary to use the slow and expensive process of electronic heat-sealing or dielectric heat-sealing, in which the abutting layers of "Saran" or "Cryovac" are pressed between electrodes which are connected to a source of alternating electric current of high frequency, in order to heat said layers by means of said high-frequency electric current and to fuse said layers to each other under the pressure. It is known that direct heat-sealing may be used for this purpose but such heat-sealing produces a weak and peelable type of seal. This weak and peelable seal is wholly unsatisfactory for many purposes, as in making bags and other containers, which are subject to rough handling.

Materials of the class of "Saran F-120" are well-known and have been used for coating purposes.

We use coating materials of the class of "Saran F-120." Other members of this class are included among which are known in the Saran F-220 and Saran F-242.

The specific material which is known in the trade as "Saran F-120," is described in page 504 of the 1953 edition of "Handbook of Material Trade Names" by Zimmerman and Lavine, published by Industrial Research Service, and also in a printed bulletin "CTS-7-1M-354" published by The Dow Chemical Company, and also in a textbook entitled "Vinyl and Related Polymers" by Schildknecht, published in 1952 by John Wiley & Sons, Inc. in New York, and by Chapman and Hall, Limited, in London.

As stated in page 466 of this text-book, which specifically mentions moisture-resistant films of "Saran F-120," this "Saran F-120" is a vinylidene chloride-acrylonitrile copolymer. Various copolymers of vinylidene chloride and acrylonitrile are described in pages 465–466 of said text-book.

The class of materials of "Saran F-120" usually have from 75% to 80% by weight of polyvinylidene chloride, the remainder being polymerized and/or copolymerized acrylonitrile. The class of materials designated by "Saran F-120" have heretofore not been commercially successfully used to coat materials of the class of "Saran" or "Cryovac."

As stated in said bulletin "CTS-7-1M-354" said "Saran F-120" is retentive of the solvents which are used in order to dissolve "Saran F-120," in order to make a coating solution. Such retention of solvents in a coating film of "Saran F-120" produces an undesirable coating film which has not only low resistance to water-vapor, but which in addition, is tacky and blocking. Hence, in previously coating materials with a solution of "Saran F-120," the coated material has been dried in zoned drying ovens or by flash drying, in order to remove the solvent of the coating solution of "Saran F-120," in order to achieve the desired resistance of the coating to water vapor. However, because of the high solvent retentiveness of the Saran F-120, the zone or flash dried coated material may still be tacky and blocking. Furthermore, excessive heat may cause the "Saran" or "Cryovac" film to shrink.

Our invention has two embodiments.

In the first embodiment, we use a special class of mixed solvents for dissolving the coating materials of the class of "Saran F-120." Immediately after coating a respective face of the base web or material of the class of "Saran" or "Cryovac" with the coating solution of "Saran F-120," in order to provide a thin coating film of the solution on the base web, the coated base material is moved into a respective drying zone which is in air which is at a temperature whose maximum may be 40° C., preferably a maximum which may be 30° C., such as 25° C.–30° C. This drying zone has the usual means for circulating the air in the drying zone and for exhausting the air from the drying zone. This drying zone is the usual hood which is open at its inlet end and its outlet end and may also open at its top. We evaporate substantially 88% to 90% by weight of the mixed solvent of the coating film in this drying zone, in a maximum period of ten seconds. At the end of this short drying period at this low temperature, the base web retains some of this mixed solvent, which does not distort the surface of the base web. At the end of this short drying period at low temperature, the coating itself retains about 2% by weight of the mixed solvent. The fresh and thin coating which results from this drying period is blocking, so that the freshly coated web cannot be immediately wound into a cylindrical roll upon the usual take-up cylinder, because the contacting layers of fresh coating in said cylindrical roll would adhere to each other, and prevent the subsequent unwinding of this cylindrical roll.

The thickness of this fresh coating may be about five microns, although this thickness may be varied.

However, we have discovered that the fresh and thin coating is not adherent to absorbent paper, such as kraft paper.

Thus, if only one face of the base web is coated, a web of absorbent paper such as kraft paper, is applied to the uncoated face of the web, immediately at the outlet end of the drying zone.

The coated base web and the absorbent web of paper are immediately cylindrically wound in interleaved form upon the usual take-up cylinder, to form a cylindrically interleaved roll under the usual tension, in which the coated face contacts the interleaved web of paper. This cylindrically interleaved roll is formed at a maximum temperature of 40° C., preferably at a maximum temperature of 30° C., as at 25° C.–30° C. This cylindrically, interleaved roll, with its layers in tight contact, is kept on the take-up cylinder in air during a finishing period of substantially twenty-four hours at 20° C.–40° C., preferably at 20° C. At the end of this finishing period of substantially twenty-four hours, the coating is no longer blocking. Hence, at the end of this finishing period of substantially twenty-four hours, the interleaved cylindrical roll can be unwound, the coated base web of "Saran" or "Cryovac" can readily be separated from the web of absorbent paper, which does not adhere to the coated face, and the coated web of "Saran" or "Cryovac" can then be cylindrically wound upon the usual take-up cylinder without objectionable blocking at the contacting layers of the coated face. The base web can be thus coated in the usual manner by a conventional coating machine of the well-known type which has a fountain which contains the coating solution and one or more rolls for applying the coating solution from this fountain to the bottom face of the web, which is the coated face in this case.

It is also well known to use a coating machine of the printing type, such as a gravure or flexographic (aniline) printing machine which applies the coating solution in spots and lines, and thus prints the coating solution in spots and lines, to form any desired design of the finished coating. We can use this type of coating machine. In such case, we can feed the absorbent web of paper, such as kraft paper, in contact with the uncoated face of the web, through said printing type of machine.

In many cases, it is desirable to coat both faces of the base web, with a continuous coating or a spot coating or other non-continuous coating of material of the class of "Saran F–120."

In such case, but without limitation thereto, we can use a conventional coating machine of the fountain type, which has two successive coating stations.

In the first embodiment, in which the fresh film of coating is initially blocking but is non-adherent to absorbent paper, such as kraft paper, the base web can be fed through said coating machine at a continuous and constant rate, such as in a range of 100 feet per minute to 150 feet per minute or higher. At the first coating station, the bottom face of the web can be coated. Immediately at the end of the first coating station, and anterior to the second coating station, the coated web is fed through a first drying zone, also at said selected constant linear feed which is in a range of 100 feet per minute to 150 feet per minute or higher. The length of this first drying zone is substantially ten feet to fifteen feet. As previously noted, the coating solution is applied at a maximum temperature of 40° C., preferably 25° C.–30° C. Also, as previously noted, the maximum period of drying in this first drying zone is substantially ten seconds, and this first drying zone is usually in air at normal atmospheric pressure and whose maximum temperature is 40° C., preferably 25° C.–30° C. We do not, however, limit ourselves to normal atmospheric pressure, but may use reduced pressure.

As previously noted, substantially 88% to 90% by weight of the solvent of the film of coating material is evaporated from the coated base web in this first drying zone, and at the outlet end of this first drying zone, the coating film itself has substantially two percent by weight of residual solvent.

At the outlet end of this first drying zone, the coated web is reversed in printing sequence in the usual manner anterior to the second coating station, so that the previously uncoated top face of the web becomes the bottom face of the web, and said uncoated face is coated at the second coating station. A second drying zone succeeds the second coating station. This second drying zone is identical with the first drying zone, and the function and effect of the second drying zone are identical with the function and effect of the first drying zone.

The base web is fed through both coating stations and through both drying zones at a selected constant speed, such as in a range of one hundred feet per minute to one hundred and fifty feet per minute, or higher.

In this embodiment, both fresh coatings are blocking at the end of the second drying zone, but both fresh coatings are non-adherent to absorbent paper, such as kraft paper. Each fresh coating may have a thickness of five microns, although this thickness may be varied.

At the end of the second drying zone, a web of absorbent paper, such as kraft paper, is applied to the partially dry first-coated face, and the coated web and the paper are fed continuously at the selected constant speed to a take-up cylinder upon which an interleaved cylindrical roll of the two webs is continuously formed in the usual manner under tension, to form cylindrically wound contacting layers of said webs. The two interleaved webs are kept on this take-up cylinder in said cylinder roll form, with the layers contacting with each other, during a finishing period of substantially 24 hours, preferably at 20° C.–30° C. At the end of said finishing period, the coatings are no longer objectionably adherent to each other, and the coated web can be separated from the interleaving web of paper, and the coated web can then be cylindrically wound upon a take-up cylinder and stored and shipped and used in the usual machine in this form.

The coated faces can be heat-sealed to each other to form a strong and permanent and non-peelable seal by ordinary heat-sealing, using moderate pressure, at 99° C. or below, using ordinary heated members, thus eliminating the slow and expensive electronic or high frequency sealing which is normally required to form a strong and permanent and non-peelable seal with uncoated "Saran" or "Cryovac." Also, the resistance of the "Saran" and "Cryovac" to water-vapor is greatly increased. Also, the original film or fail of "Saran" or "Cryovac" retains its original strength because excessive heat is not used in the coating process or in the heat-sealing process. We thus produce an improved final, coated material.

We can operate our improved method as a low-cost, continuous method, up to and including the formation of the interleaved, cylindrical roll.

In a second embodiment and method, we form a fresh coating on one or both faces of the base material, which is non-blocking, thus eliminating the paper interleaving and also eliminating the finishing period on the take-up roll. In the second method, we can likewise use the fountain type of coating machine.

In both methods and embodiments, we can operate in every step at ordinary room temperature of 20° C.–30° C., thus avoiding undesirable heating of the "Saran" or "Cryovac." In the second method, we use one or two drying zones, as previously described, and we can duplicate the first embodiment save for the omission of the interleaving web of paper and the omission of the finishing period of the cylindrical roll on the take-up cylinder. In both embodiments the thickness of a finished coating may be five microns, although the thickness may be varied.

Some examples of our improved method are stated below. In these examples, the base material was "Saran" film whose thickness was 0.0005 inch or about 12.5 microns. The thickness of the film is usually from 0.0005 inch to 0.002 inch, although heavier films may be used. These examples also apply to "Cryovac." In said examples, the "Saran" was a plasticized and oriented copolymer of vinylidene chloride and vinyl chloride, which had 90% by weight of polyvinylidene chloride and ten percent by weight of polyvinyl chloride, and a softening point of 115° C. to 138° C.

In these examples, the coating material was the "Saran F-120" which is easily soluble in tetrahydrofuran, $C_4H_8O$. This solvent is designated in the technical literature at THF. Said THF solvent has a boiling point of 66° C. Said commercial "Saran F-120" is also soluble in methyl ethyl ketone (MEK). The viscosity of said commercial "Saran F-120" is estimated by measuring the viscosity of a twenty percent by weight solution of Saran F-120 in powdered form in MEK. Such viscosity is in a range of 40 centipoises to 1,000 centipoises. In these examples, we used a grade of said commercial "Saran F-120," whose 20% by weight solution in MEK had a viscosity of 200 centipoises.

The invention is not limited to these specific details, which are stated only to furnish complete data upon the illustrative examples, to which the invention is not limited.

The formulas are also illustrative and the invention is not limited thereto.

FIRST EMBODIMENT (RESULTING IN A FRESH COATING FILM WHICH IS BLOCKING AND WHICH REQUIRES INTERLEAVING)

In this first embodiment we can use a major proportion of tetrahydrofuran (THF) and minor proportions of normal hexane and of methyl ethyl ketone (MEK) and we can replace all or a part of the MEK by normal octane. Hence we use aliphatic compounds as diluents for the THF.

THF is described in page 1078 of said 1956 edition of "The Condensed Chemical Dictionary." As above mentioned, it has the formula $C_4H_8O$ and a boiling point of 66° C.

Normal hexane (n-hexane) is described in page 557 of said 1956 edition of "The Condensed Chemical Dictionary" as having the formula $CH_3(CH_2)_4CH_3$, with a boiling point of substantially 68° C.

As is well known, the boiling point of MEK is 79.6° C.

As is well known, normal octane (n-octane) has the formula $CH_3(CH_2)_6CH_3$, with a boiling point of substantially 125° C.

Formula No. 1
COATING SOLUTION OF "SARAN F-120"

In this formula, as in all the other formulas, the proportions are by weight.

| | Percent |
|---|---|
| (1) "Saran F-120" | 20.70 |
| (2) THF | 54.60 |
| (3) n-Hexane | 12.50 |
| (4) MEK | 12.20 |
| | 100.00 |

The proportions of the solvent in said coating solution are substantially as follows:

| | Percent |
|---|---|
| THF | 68.90 |
| n-Hexane | 15.80 |
| MEK | 15.30 |
| | 100.00 |

This is substantially 70% of THF and substantially equal parts of n-hexane and MEK.

When the coating solution of Formula No. 1 is used in a coating machine, there is some evaporation of the ingredients of the solvent. A good replenishing solvent is as follows:

Formula No. 2
REPLENISHING SOLVENT FOR COATING SOLUTION OF FORMULA NO. 1

| | Percent |
|---|---|
| THF | 70 |
| n-Hexane | 15 |
| MEK | 15 |

By adding the replenishing solvent to the fountain, the coating solution is kept at its proper operating viscosity.

Formula No. 3
MODIFIED COATING SOLUTION

| | Percent |
|---|---|
| "Saran F-120" | 20.70 |
| THF | 54.30 |
| n-Hexane | 15.00 |
| n-Octane | 10.00 |
| | 100.00 |

The proportions of the solvent in said coating solution are substantially as follows:

| | Percent |
|---|---|
| THF | 68.60 |
| n-Hexane | 18.80 |
| n-Octane | 12.60 |
| | 100.00 |

This solvent has substantially 70% of THF. The n-octane is substantially 60% of the n-hexane.

Formula No. 4
REPLENISHING SOLVENT FOR COATING SOLUTION OF FORMULA NO. 3

| | Percent |
|---|---|
| THF | 70.00 |
| n-Hexane | 18.00 |
| n-Octane | 12.00 |
| | 100.00 |

The n-hexane and the n-octane, in the proportions used, weaken the intervalence action between the THF and the "Saran F-120," as well as the intervalence action between the THF and the "Saran" and "Cryovac" films.

The THF penetrates the base material of "Saran" or "Cryovac" during the coating operation. By using suitable diluents in suitable proportion, excessive penetration of the base film or foil by the THF is prevented. The MEK acts to accelerate evaporation of the THF during the drying period or drying periods.

The n-hexane is hydrophobic, insoluble in water, and does not wet the paper during the finishing period.

The n-octane is insoluble in water, and it also cannot wet the paper.

The methyl ethyl ketone is soluble in water and it can wet the paper.

The tetrahydrofuran is soluble in water and it can wet the paper, and be absorbed by the paper during the finishing period.

Thus the active solvents THF and MEK are preferentially removed from the coated film by the paper.

SECOND EMBODIMENT (INTERLEAVING WITH PAPER IS NOT REQUIRED)

The highly preferred formulas stated below, make it unnecessary to use paper and to use a finishing period.

Formula No. 5
COATING COMPOSITION

| | Percent |
|---|---|
| (A) "Saran F-120" | 17.50 |
| (B) Tetrahydrofuran (THF) | 57.50 |
| (C) Toluol | 22.50 |
| (D) "Santocel" No. 54 | 00.62 |
| (E) Corn starch | 00.63 |
| (F) Methyl ethyl ketone (MEK) | 1.20 |
| (G) "Dow Corning Silicone Fluid" | 00.05 |
| | 100.00 |

The toluol is of the type described in page 1101 of the 1956 edition of said "The Condensed Chemical Dictionary." It has a boiling point of substantially 110° C. It is an example of a diluent which is an aromatic hydrocarbon. It may be replaced in whole or in part by another aromatic hydrocarbon, such as xylene.

"Santocel" is a silica aerogel which is described in page 964 of said 1956 edition of "The Condensed Chemical Dictionary," which also refers to "Santocel" No. 54. A typical analysis of "Santocel" is $SiO_2$, 90% minimum; $Na_2SO_4$, 2.7% maximum; $Al_2O_3$ and $Fe_2O_3$, 1%; volatile, 4% to 6%; pH of four grams in 100 cc. of water, 3.5 to 4.0. The volatile portion is water, alcohol and acetaldehyde.

The particle size of the "Santocel" No. 54, is substantially five to six microns.

The corn starch may be replaced by rice starch as well as by other starches. The particle size of corn starch is from 10 to 25 microns.

The "Dow Corning 200 Fluids" are described in page 411 of said 1956 edition of "The Condensed Chemical Dictionary." They refer to a variety of polydimethyl siloxanes, which have a general formula,

$$(CH_3)Si[SiO(CH_3)_2]_nOSi(CH_3)_3$$

The value of "$n$" may be from one to 2,000. Their viscosity may range from 0.65 centistoke to over 1,000 centistokes. As is well known, a "centistoke" is a kinematic viscosity unit corresponding to a centipoise. In this example, but without limitation thereto, we use a "Dow Corning 200 Fluid" which has a kinematic viscosity of one hundred centistokes. Other silicone fluids can be used. These silicone fluids are defined in page 981 of said 1956 edition of "The Condensed Chemical Dictionary" as organosiloxane polymers, whose viscosity is in the range from 0.65 to over a million centistokes, including methyl and phenyl polysiloxanes. The specific percentage of the silicone fluid is not sharply critical and may vary.

The composition of said mixed solvent of Formula No. 5 is substantially as follows:

Formula No. 6

| | Percent |
|---|---|
| Tetrahydrofuran | 70.77 |
| Toluol | 27.70 |
| Methyl ethyl ketone | 1.53 |
| | 100.00 |

If the coating machine has an open fountain, the above-mentioned viscosity of the coating composition of Formula No. 5 can be substantially maintained by adding replenishing solvent as follows:

Formula No. 7

| | Percent |
|---|---|
| Tetrahydrofuran | 75.7 |
| Toluol | 21.7 |
| Methyl ethyl ketone | 2.6 |
| | 100.00 |

Formula No. 5 is used as previously described, but omitting the paper interleaving and the finishing period.

Microscopic examination has shown that the finished coating has particles of starch and of the No. 54 "Santocel" distributed in said coating. The particles of starch and "Santocel" interrupt the continuous or spot coating, and thus provide more rapid evaporation of the mixed solvent. The silicone fluid acts as an anti-blocking agent, and it is an important ingredient. The MEK acts to accelerate the evaporation of the THF. The coating solution is maintained uniform during the coating operation.

The functions of the toluol are to accelerate the evaporation rate of the THF from the coating solution, and to control the degree of penetration of the THF into the "Saran" or "Cryovac" films. While these functions are also performed by the aliphatic hydrocarbons n-hexane and n-octane previously mentioned, toluol is tolerated to a much greater degree in the coating solution, and hence is much more effective than the aliphatic hydrocarbons.

We have thus made a valuable discovery in both embodiments, namely, that while some retention of the THF by the base material is not objectionable, this retention can be controlled to any desired degree. Thus, in using the coating solution of Formula No. 5, the fresh coating is not blocking, even though the fresh coating, at the end of the respective drying zone, has substantially 2% by weight of solvent.

We have also discovered in both embodiments, that by selecting a solvent which has a major proportion of THF and suitable diluents in suitable proportion, we can operate at ordinary room temperature and in air at ordinary pressure of 760 millimeters of mercury or reduced pressure, and that we can operate continuously at conventional coating speed, so that the coated web, either interleaved or not interleaved, can be continuously cylindrically wound at coating speed upon a take-up cylinder or other take-up member.

In both embodiments, the base material has a smooth coating, which is fully permeable to light. If the base material is transparent, the coated material is also transparent. In both embodiments, we provide a non-blocking coating film, and abutting layers of said coating film are heat-sealable to each other to form a firm and non-peeling joint, at a temperature well below the fusion temperature of the base material. The invention includes all base materials which are permeable to THF, so that in its broad aspect, the invention is not limited to base materials of the class of "Saran" or "Cryovac." Also, the idea of providing a coating film which has particles which interrupt the continuity of said film, is wholly novel and is not limited to a base material of the class of "Saran" or "Cryovac." The invention is not limited to the use of both starch and "Santocel" or either of them. It is noted that the percentage by weight of both types of particles in Formula No. 5 is substantially 6% to 7% of the coating material, namely, the "Saran F-120." Each of these particles can absorb the coating material.

The invention is defined and further disclosed in the appended claims. When we refer to a coating film, this may be continuous or in spots.

We claim:

1. A coated base material, said base material being selected from the group consisting of polyvinylidene chloride and copolymers of vinylidene chloride with a lesser amount of other unsaturated compounds, said base material being permeable to tetrahydrofuran, said base material having a non-blocking and moisture-resistant coating film of a vinylidene chloride-acrylonitrile copolymer, the composition of said coating film being different from the composition of said base material, abutting layers of said coating film being heat-sealable to each other to form a non-peeling joint at a temperature below the fusion point of said base material.

2. A coated foil base material, said base material being a copolymer of vinylidene chloride with a lesser amount of vinyl chloride, said base material being permeable to tetrahydrofuran, said base material having a non-blocking and moisture-resistant coating film of vinylidene chloride-acrylonitrile copolymer, abutting layers of said coating film being heat-sealable to each other to form a non-peeling joint at a temperature below the fusion point of said base material.

3. A coated base material, said base material being permeable to tetrahydrofuran, said base material having a non-blocking coating film of a coating material which is soluble in tetrahydrofuran, said film being the residue of a solution of said coating material on tetrahydrofuran, said film having a sufficient proportion of a silicone fluid and of solid particles to make said residue non-blocking.

4. A coated base material according to claim 3, which has particles whose thickness is at least substantially equal to the thickness of said film.

5. A coated base material according to claim 3, said base material being a copolymer of vinylidene chloride with a lesser amount of vinyl chloride, said coating material being a vinylidene-chloride-acrylonitrile copolymer.

6. A coated base material according to claim 4, said base material being a copolymer of vinylidene chloride with a lesser amount of vinyl chloride, said coating material being a vinylidene chloride-acrylonitrile copolymer.

7. A method of coating a web base material which is permeable to tetrahydrofuran with a coating material which is soluble in tetrahydrofuran, which consists in coating said web of base material with a solution of said coating material in a mixed solvent which consists of a major proportion of tetrahydrofuran and a minor proportion of organic diluents which have respective boiling points above 66° C., forming a film of said solution at a maximum temperature of substantially 40° C. on said base material while penetrating said base material with said tetrahydrofuran, limiting said penetration to prevent any substantial distortion of said base material, and then evaporating substantially 88% to 90% by weight of said solvent in air to provide a residual blocking coating film which contains tetrahydrofuran, also interleaving said web with a web of absorbent material, cylindrically winding said webs, and storing the cylindrically wound interleaved webs at a maximum temperature of substantially 40° C. until said coating film is non-blocking.

8. A coating solution of a vinylidene chloride-acrylonitrile copolymer, the solvent of said solution consisting substantially of tetrahydrofuran and an organic aromatic diluent which accelerates the evaporation of the tetrahydrofuran from said solution and methyl ethyl ketone, the diluent being substantially 40% of the tetrahydrofuran, the methyl ethyl ketone being substantially 3% of the tetrahydrofuran, said solution also having intermixed solid particles consisting of equal parts of starch and a silica aerogel which consists substantially of silicon and sodium sulphate and aluminum oxide and ferric oxide whose weight is at least substantially 6% of the weight of said copolymer, a residue of said coating solution being non-blocking.

9. A coating solution according to claim 8, in which said organic aromatic diluent is toluol.

10. A base material selected from the group consisting of polyvinylidene chloride and copolymers of vinylidene chloride, with a lesser amount of other unsaturated compounds, said base material having a freshly made coating of a vinylidene chloride-acrylonitrile copolymer, said last-mentioned copolymer being soluble in tetrahydrofuran, said freshly made coating being a residue of a solution of said last-mentioned copolymer in a solvent which includes tetrahydrofuran, said freshly made coating including residual tetrahydrofuran and being blocking in the absence of an anti-blocking agent, said coating containing a sufficient proportion of a silicone fluid and of solid-particle anti-blocking agents to make said freshly made coating non-blocking.

11. A base material selected from the group consisting of polyvinylidene chloride and copolymers of vinylidene chloride with a lesser amount of other unsaturated compounds, said base material having a freshly made coating of a vinylidene chloride-acrylonitrile copolymer, said last-mentioned copolymer being soluble in tetrahydrofuran, said freshly made coating being a residue of a solution of said last-mentioned copolymer in a solvent which includes tetrahydrofuran, said coating including residual tetrahydrofuran and being blocking in the absence of an anti-blocking agent, said coating containing a sufficient proportion of a silicone fluid and of the starch anti-blocking agents to make said coating non-blocking.

References Cited in the file of this patent

UNITED STATES PATENTS 2,658,052   Signer et al. _____ Nov. 3, 1953

OTHER REFERENCES

Payne: "Organic Coating Technology," John Wiley & Sons, N. Y. C., 1954, page 267.

Doolittle: "Technology of Solvents and Plasticizers," John Wiley & Sons, N. Y. C., 1954, page 452.